United States Patent
Osmond et al.

(10) Patent No.: US 9,825,997 B2
(45) Date of Patent: Nov. 21, 2017

(54) MEDIATOR FOR OPTIMIZING THE TRANSMISSION OF MEDIA CONTENTS BETWEEN A MULTIMEDIA RESOURCE FUNCTION AND A PLURALITY OF TERMINALS

(71) Applicant: Alcatel Lucent, Boulogne-Billancourt (FR)

(72) Inventors: Marin Osmond, Boulogne-Billancourt (FR); Cédric Laisnard, Boulogne-Billancourt (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/772,615

(22) PCT Filed: Mar. 5, 2014

(86) PCT No.: PCT/EP2014/054206
§ 371 (c)(1),
(2) Date: Sep. 3, 2015

(87) PCT Pub. No.: WO2014/154453
PCT Pub. Date: Oct. 2, 2014

(65) Prior Publication Data
US 2016/0021147 A1  Jan. 21, 2016

(30) Foreign Application Priority Data

Mar. 28, 2013 (EP) .................................... 13305383

(51) Int. Cl.
*H04L 12/18* (2006.01)
*H04L 29/06* (2006.01)

(52) U.S. Cl.
CPC ........ *H04L 65/1016* (2013.01); *H04L 65/102* (2013.01); *H04L 65/1023* (2013.01);
(Continued)

(58) Field of Classification Search
None
See application file for complete search history.

(56) References Cited

U.S. PATENT DOCUMENTS

| 7,079,495 B1* | 7/2006 | Pearce ................ H04L 12/1818 340/3.52 |
| 2010/0165889 A1* | 7/2010 | Madabhushi ....... H04M 3/2227 370/261 |

(Continued)

OTHER PUBLICATIONS

International Search Report PCT/ISA/210 for International Application No. PCT/EP2014/054206 dated May 8, 2014.
(Continued)

*Primary Examiner* — Brandon Renner
(74) *Attorney, Agent, or Firm* — Harness, Dickey & Pierce, P.L.C.

(57) ABSTRACT

A mediator for the transmission of media contents includes means for receiving video content requests from terminals when they request to take part in said video call conference, and for optimizing these requests, in order to avoid requesting any redundant video stream from a multimedia resource function, before forwarding the optimized requests to the multimedia resource function; means for implementing virtual conferees as a function of the video content requests from said terminals, for receiving the video streams that have been requested by the optimized request, from the multimedia resource function, and then forwarding the received video streams to the terminals that have requested them, in a broadcast way when a same video stream has been requested by several terminals, and means for commanding the telephony server to accept the implemented virtual conferees in the video call conference.

5 Claims, 10 Drawing Sheets

(52) U.S. Cl.
 CPC ........ *H04L 65/1069* (2013.01); *H04L 65/403* (2013.01); *H04L 65/4076* (2013.01)

(56) References Cited

U.S. PATENT DOCUMENTS

| | | |
|---|---|---|
| 2011/0305170 A1 | 12/2011 | Lai et al. |
| 2014/0031019 A1* | 1/2014 | Qi .......................... H04W 4/00 455/416 |

OTHER PUBLICATIONS

Written Opinion of the International Searching Authority PCT/ISA/237 for International Application No. PCT/EP2014/054206 dated May 8, 2014.

* cited by examiner

MEDIATOR FOR OPTIMIZING THE TRANSMISSION OF MEDIA CONTENTS BETWEEN A MULTIMEDIA RESOURCE FUNCTION AND A PLURALITY OF TERMINALS

CROSS-REFERENCE TO RELATED APPLICATIONS

This application is a national phase under 35 U.S.C. §371 of PCT International Application No. PCT/EP2014/054206 which has an International filing date of Mar. 5, 2014, which claims priority to European patent application number EP 13305383.5 filed Mar. 28, 2013, the entire contents of each of which are hereby incorporated by reference.

BACKGROUND OF THE INVENTION

Field of the Invention

The present invention generally relates to the optimization of the transmission of media contents between a multimedia resource function and a plurality of terminals when these terminals are conferees in a same video call conference. This multimedia resource function belongs to a first telecommunication network that is an Internet Protocol Multimedia Subnetwork (IMS) network, and the terminals may be connected to the same IMS network or to a second telecommunication network that constitutes an "outside world" with respect to the first network because it uses different protocols.

Description Of The Prior Art

For instance, the first network is an IMS operator network, and the outside world is the World Wide Web (the "Web") operating on the Internet. There are interconnections between these two worlds. These interconnections are made by gateways using Web standards (eg. W3C webRTC or IETF rtcWEB) and legacy telecommunication standards (eg. 3GPP IMS, OMA RCS . . . ). Such a gateway acts as a bridge for signalization and data (media) channels according to each side standards.

In the Web, the logic of an application is generally placed in the end user terminal, for instance a smartphone. The World Wide Web Consortium (W3C) has drafted an application programming interface called WebRTC (Web Real-Time Communication) to enable browsers to run applications for voice call, video chat, and peer to peer file sharing, without plugins. An advantage of WebRTC, among others, is that each user can use an application that is not downloaded from a store and not previously installed in its terminal. This application remains in an application server, in the operator network. This will allow to distribute or make available a huge set of applications that the providers will update and modify without any modification in end users' terminals.

In the operator telcommunication networks, the users, even with smartphones, use basic applications (audio call, video call, presence, address book, instant messaging, shared document . . . ) to reach services deployed in these operator networks, because these services are essentially provided by application servers deployed in the operator networks.

The known gateways only act as bridges for signalization and data (media) channels. As it will be explained further, the transmission of video streams for a video call conference uselessly consumes some network resources between the multimedia resource function and the multimedia gateway.

The purpose of this invention is to optimize the transmission of media contents between a multimedia resource function and a plurality of terminals.

This purpose can be reached by applying the method and the gateway according to the invention.

SUMMARY OF THE INVENTION

A first object of the invention is a mediator for optimizing the transmission of media contents between a multimedia resource function and a plurality of terminals when these terminals are conferees in a same video call conference created by a telephony server; characterized in that it comprises:

means for receiving video content requests from said terminals when they request to take part in said video call conference, and for optimizing these requests, in order to avoid requesting any redundant video stream from the multimedia resource function, and then forwarding the optimized requests to the multimedia resource function;

means for implementing virtual conferees as a function of the video content requests from said terminals, for receiving the video streams that have been requested by the optimized requests, from the multimedia resource function (MRF), and then forwarding the received video streams to the terminals that have requested them, in a broadcast way when a same video stream has been requested by several terminals, and means for commanding the telephony server to accept the implemented virtual conferees in the video call conference.

This mediator enables to reduce the network resources used for the transmission of media contents between a multimedia resource function and a plurality of terminals, because the mediator is inserted on the path between the multimedia resource function and the plurality of terminals, and because the number of video streams is reduced on the part of the path laying between the multimedia resource function and the mediator, thanks to the means for optimizing the video content requests, since there is no redundant video stream from the multimedia resource function to the mediator. The terminals receive all the video contents that they have requested, in spite of the reduction of the number of video streams, thanks to the virtual conferees that broadcast the video streams received by the mediator, as broadly as necessary, to the terminals.

Other features and advantages of the present invention will become more apparent from the following detailed description of embodiments of the present invention, when taken in conjunction with the accompanying drawings.

BRIEF DESCRIPTION OF THE DRAWINGS

In order to illustrate in detail features and advantages of embodiments of the present invention, the following description will be with reference to the accompanying drawings. If possible, like or similar reference numerals designate the same or similar components throughout the figures thereof and description, in which.

DETAILED DESCRIPTION OF THE PREFERRED EMBODIMENTS

Figure 1:
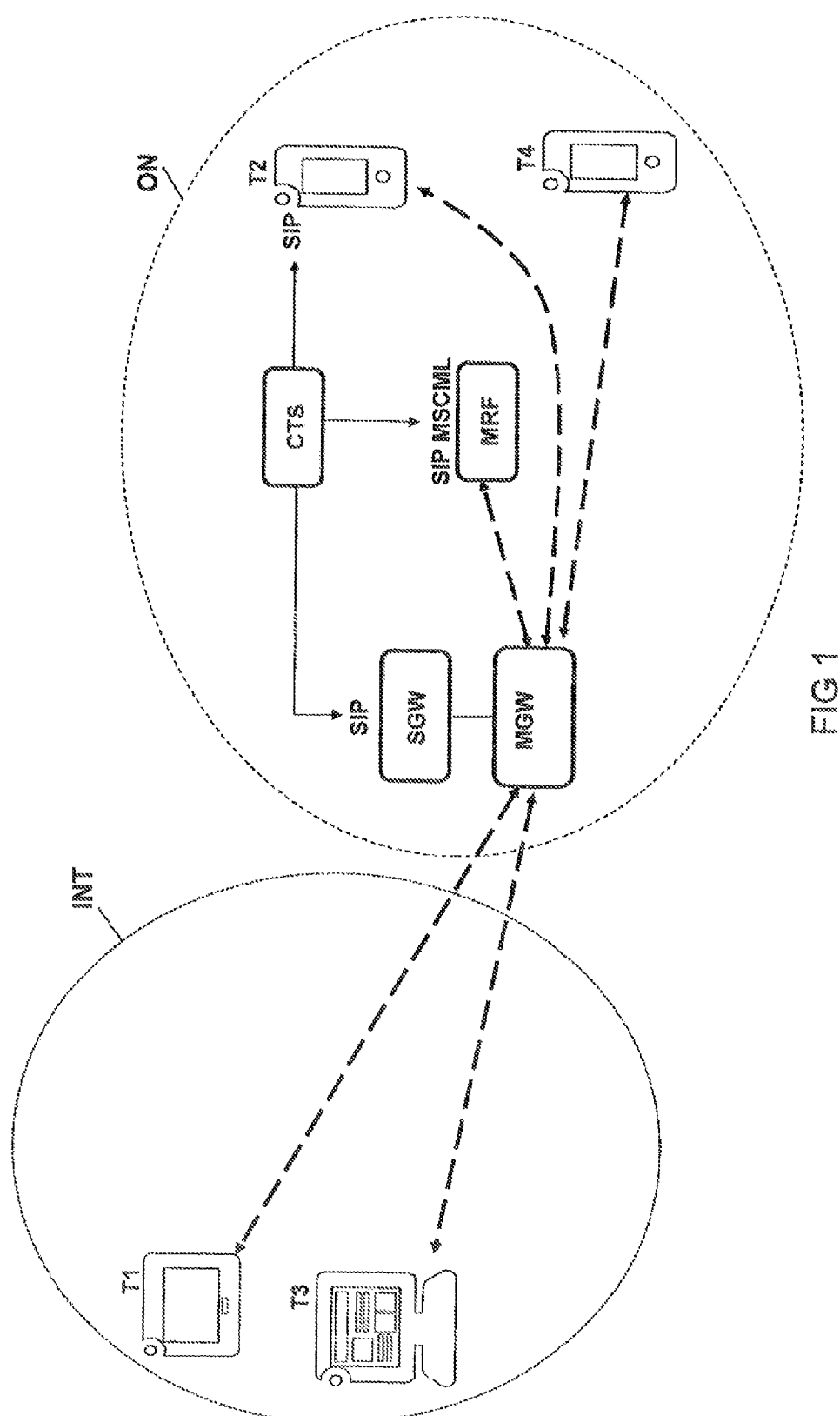
FIG. 1 illustrates the prior art, for a video call conference attended by two exemplary terminals connected to the Internet and two exemplary terminals connected to an operator telecommunication network.

FIG. 1 illustrates the prior art, for a video call conference attended by two exemplary terminals Web terminals T1 and T3 connected to the Internet INT and two exemplary classical terminals T2 and T4 connected to an IMS operator telecommunication network ON. Each of these terminals comprises means for taking part to a video conference call. For instance T1 is a tablet, T3 is a personal computer; T2 and T4 are smartphones.

The operator telecommunication network ON comprises:
A classical convergence telephony server CTS.
A classical media resource function MRF that is coupled to the convergence telephony server CTS for receiving commands using the media server control markup language (MSCML) in conjunction with the Session Initiation Protocol (SIP).
A classical signaling gateway SGW, at the border between the Internet INT and the operator network ON.
A classical media gateway MGW, at the border between the Internet INT and the operator network ON.

The media gateway MGW converts the audio and video data streams from the Web standards (eg. W3C webRTC or IETF rtcWEB) to the legacy telecommunication standards (eg. 3GPP IMS, OMA RCS . . . ), and conversely. The signaling gateway SGW acts similarly for signalization data streams. So the Web terminals T1, T3 can communicate with the classical terminals T2, T4 via the gateways SGW and MGW. They can be put into a conference altogether thanks to the multimedia resource function MRF.

The media resource function MRF provides media related functions (e.g. mixing voice streams) and playing of tones and announcements. It interprets commands coming from an application server, the convergence telephony server CTS in this example. In particular, the media resource function MRF delivers advanced multimedia conferencing services.

The language MSCML is used in conjunction with the protocol SIP to deliver advanced multimedia conferencing services over IP networks. It enables enhanced conference control functions such as muting individual callers or legs in a multi-party conference call. Other control functionalities enabled by the language MSCML include the ability to increase or decrease the volume on a leg or on the call; and the capability to create sub-conferences. It also addresses other feature requirements for large-scale conferencing applications, such as sizing and resizing of a conference.

The convergence telephony server CTS and the media resource function MRF work together in a client-server relationship; the convergence telephony server CTS providing the service logic for each specific application, and the media resource function MRF acting as a shared media processing resource for the applications. The media resource function MRF operates under the command of the convergence telephony server CTS, managing and allocating its processing resources to match the requirements of each application. In this example, its role is to handle requests from the convergence telephony server CTS for performing media processing on packetized media streams for a video call conference.

Figure 2:
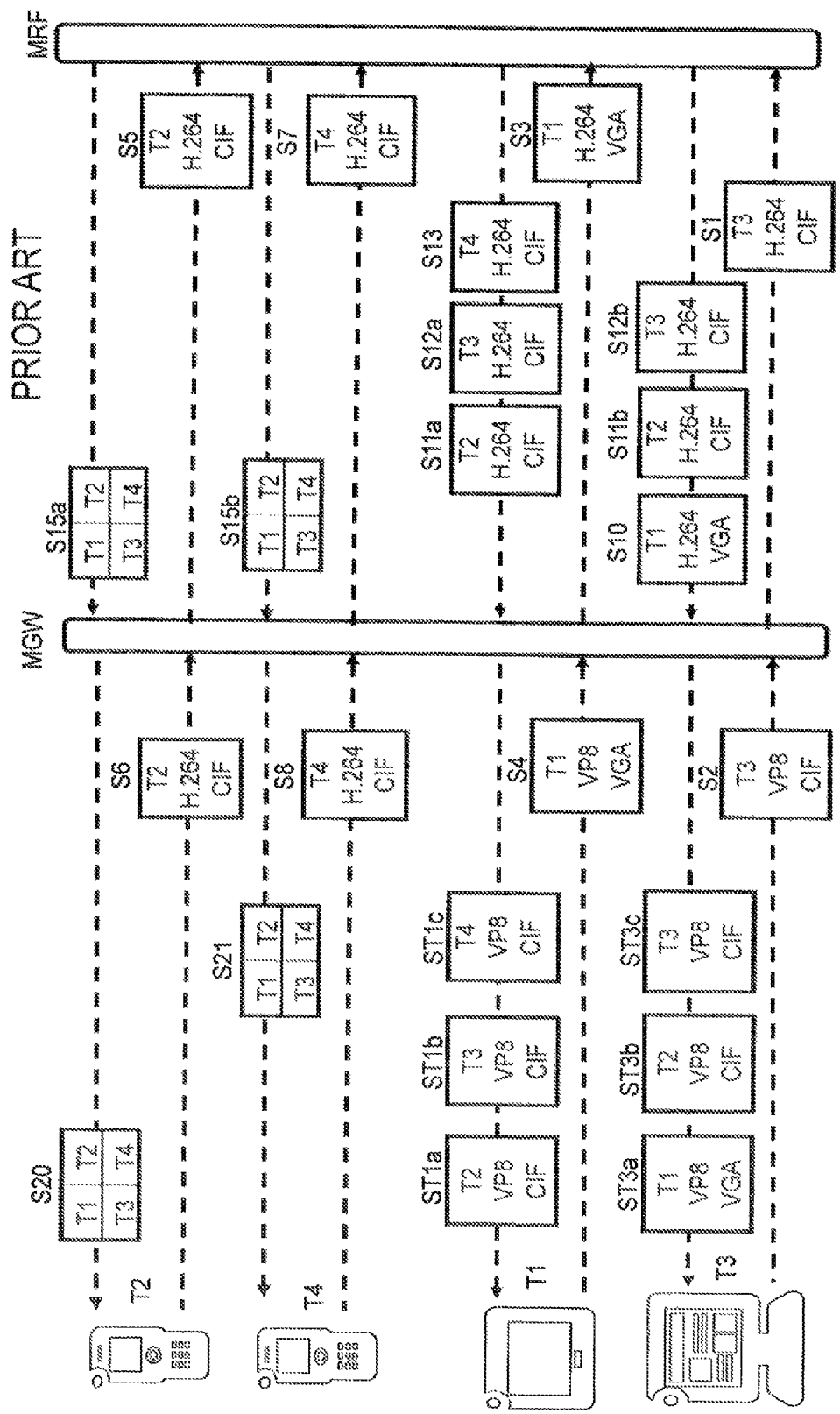
FIG. 2 represents video streams exchanged during the video conference call between these four exemplary terminals, according to the prior art.

FIG. 2 represents video streams exchanged during the video conference call between these four exemplary terminals, T1, T2, T3, T4, according to the prior art. The terminal T1 generates a video data stream S4 produced by a classical codec VP8 and uses the classical format VGA. This video stream S4 is classically converted into a new video data stream S3 by the media gateway MGW. It is produced by a classical codec H.264 with the classical format VGA. Then the new stream S3 is sent to the media resource function MRF.

The terminal T2 generates a video data stream S6 produced by a classical codec H264 with the classical format CIF. This stream S6 is directly forwarded by the media gateway MGW, as a video stream S5, to the media resource function MRF because it does not need a change of protocol.

The terminal T3 generates a video data stream S2 produced by a classical codec VP8 and uses the classical format CIF. This stream is classically converted into a new video data stream S1 by the media gateway MGW. It is produced by a classical codec H.264 with the classical format VGA. Then the new stream S1 is sent to the media resource function MRF.

The terminal T4 generates a video data stream S7 produced by a classical codec H264 with the classical format CIF. This stream is directly forwarded by the media gateway MGW, as a video stream S7, to the media resource function MRF because it does not need a change of protocol.

The web terminal T1 requests the convergence telephony server CTS (not represented on this figure) to send it the video data streams respectively generated by the terminals T2, T3, T4, in the so called projecting mode, i. e. without mixing the images respectively captured by the different terminals T2, T3, T4.

The terminal T2 requests the convergence telephony server CTS to join the conference, and requests the convergence telephony server CTS to send it the video data streams respectively generated by the terminals T1, T2, T3, T4, in the so called tiled display mode, i. e. they are mixed in a single stream such that each received image comprises four quarters respectively showing four images respectively captured by the terminals T1, T2, T3, T4. Or the terminal T2 accepts an invitation to join the conference, originating from another terminal via the convergence telephony server CTS and will receive the default tiled display composed by the multimedia resource function MRF.

The web terminal T3 requests the convergence telephony server CTS to send it the video data streams respectively generated by the terminals T1, T2, T3 in projecting mode, i. e. the user of the terminal T3 does not want to see the user of terminal T4 and prefers to watch himself/herself.

The terminal T4 requests the convergence telephony server CTS to join the conference, and requests the convergence telephony server CTS to send it the video data streams respectively generated by the terminals T1, T2, T3, T4, in the tiled display mode. Or the terminal T4 accepts an invitation to join the conference, originating from another terminal via the convergence telephony server CTS and will receive the default tiled display composed by the multimedia resource function MRF.

Under the command of the convergence telephony server CTS, the media resource function MRF generates the following video data streams, and sends them to the media gateway MGW:

- A first stream addressed to the terminal T1, generated by multiplexing the video data streams S11a, S12a, S13 respectively carrying the video data originating from the terminals T2, T3, T4 and transcoded by a codec H.264 with the format CIF.
- A second stream addressed to the terminal T3 by multiplexing the video data streams S10, S11b, S12b, respectively carrying the video data originating from the terminal T1 transcoded by a codec H.264 with the format VGA and the video data originating from the terminals T2, T3, transcoded by a codec H.264 with the format CIF.
- A third stream S15a addressed to the terminal T2, by associating the images captured by the terminals T1, T2, T3, T4, in tiled display mode.
- A fourth stream S15b addressed to the terminal T4, by associating the images captured by the terminals T1, T2, T3, T4, in tiled display mode.

These four streams are sent to the media gateway MGW. This latter supplies four streams to the terminals T1, T2, T3, T4 after doing protocol conversions when it is necessary:

- A first stream addressed to the Web terminal T1, is generated by multiplexing video data streams ST1a, ST1b, ST1c obtained by converting the video streams S11a, S12a, S13, by a codec VP8 with the format CIF.
- A second stream addressed to the Web terminal T3 by multiplexing video data streams ST3a, ST3b, ST3c obtained by converting the video streams S10, S11b, S12b, by a codec VP8 without changing their respective formats.
- A third stream S20 addressed to the terminal T2, identical to the stream S15a carrying the images captured by the terminals T1, T2, T3, T4, in tiled display mode.
- A fourth stream S21 addressed to the terminal T4, identical to the stream S15b carrying the images captured by the terminals T1, T2, T3, T4, in tiled display mode.

If the terminals T2 and T4 were subscriber of the IMS network hosting this conference, the above third and fourth streams could be replaced by a direct sending of the stream S15a from the multimedia resource function MRF to the terminal T2; and the stream S15b from the multimedia resource function MRF to the terminal T4. We describe here the case of visited IMS networks hence the necessity of crossing the border gateway MGW.

One can remark that there is some redundancy in the streams going from the multimedia resource function MRF to the multimedia gateway MGW. The streams S15a and S15b are identical since both carry the images captured by the terminals T1, T2, T3, T4, in tiled display mode.

The streams S12a and S12b are identical since they carry the same video data originating from the terminal T3, coded with the codec H.264 and the format CIF. The streams S11a and S11b are identical since they carry the same video data originating from the terminal T2, coded with the codec H.264 and the format CIF. So this prior art architecture uselessly consumes some network resources between the multimedia resource function MRF and the multimedia gateway MGW.

Figure 3:
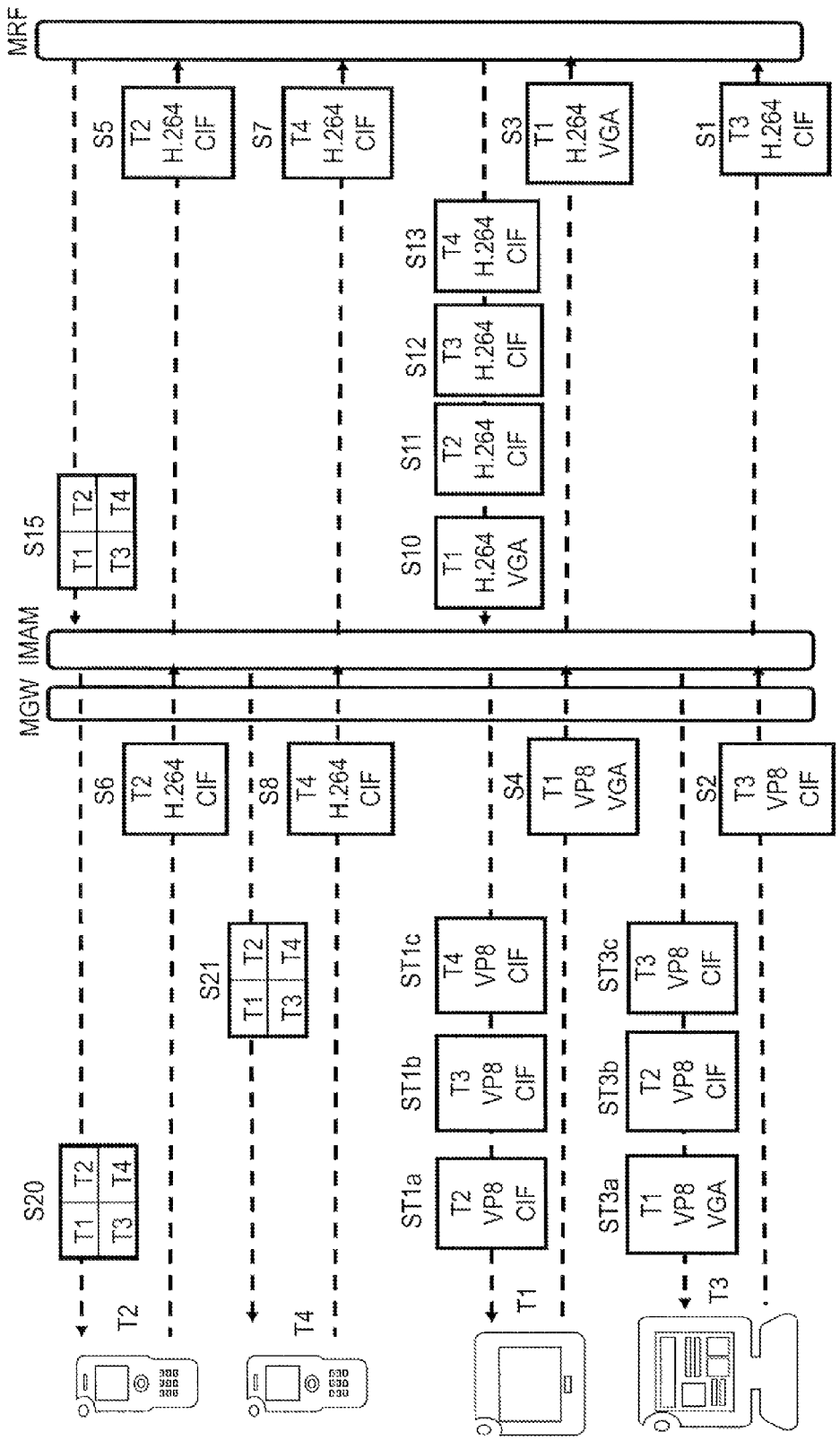
FIG. 3 represents video streams exchanged during a video conference call between these four exemplary terminals when a first embodiment of the mediator according to the invention is used.

FIG. 3 represents video streams exchanged during a similar video conference call between these four exemplary terminals T1, T2, T3, T4, when a first embodiment IMAN of the mediator according to the invention is associated to the classical media gateway MGW and to the classical media resource function MRF. The terminals T1, T2, T3, T4, generate and receive the same video data streams as in the example illustrated by FIG. 2.

The terminal T1 generates a video data stream S4 by a classical codec VP8 and uses the classical format VGA. This stream S4 is classically converted into a new video data stream S3 by the media gateway MGW; then the new stream S3 is sent to the media resource function MRF via the mediator IMAM.

The terminal T2 generates a video data stream S5 by a classical codec H264 and uses the classical format CIF. This stream is directly sent to the media resource function MRF as a stream S5 via the mediator IMAM.

The terminal T3 generates a video data stream S2 by a classical codec VP8 and uses the classical format CIF. This stream S2 is classically converted into a new video data stream S1 by the media gateway MGW, and then the new stream S3 is sent to the media resource function MRF via the mediator IMAM.

The terminal T4 generates a video data stream referenced S8 produced by a classical codec H264 and uses the classical format CIF. This stream S8 is directly sent to the media resource function MRF, as a stream S7, via the mediator IMAM.

The mediator IMAM comprises control means (not represented on the FIG. 3) for receiving video content requests from the terminals T1, T2, T3, T4, when they request to take part in the video call conference. It also comprises means for optimizing these requests, before forwarding them to the convergence telephony server CTS. The mediator IMAM optimizes the requests in order to avoid requesting any redundant video stream from the multimedia resource function MRF. The convergence telephony server CTS satisfies the requests by sending commands to the multimedia resource function MRF.

Under the command of the convergence telephony server CTS, the media resource function MRF supplies the following video data streams to the mediator IMAM:

- A first stream constituted by multiplexing the video data streams S10, S11, S12, S13 respectively carrying the video data generated by the terminals T1, T2, T3, T4, coded by a codec H.264 with a format CIF, in projecting mode.
- A second stream S15 where each image is composed of images from all the received video streams S10, S11, S12, S13, in tiled mode.

One can remark that there is no more useless redundancy in the streams transmitted from the multimedia resource function MRF to the multimedia gateway MGW.

The control means (not represented on the FIG. 3) of the mediator IMAM send commands to the convergence telephony server CTS for creating at least one virtual conferee for:

- receiving the video streams S10-S11-S12-S13 and S15 that are generated by the multimedia resource function MRF,
- separating the multiplexed streams S10-S11-S12-S13 into four independent streams,
- and then forwarding the received video streams S10, S11, S12, S13, S15 to the terminals that have requested them, in a broadcast way when a same video stream has been requested by several terminals.

This broadcasting creates some redundant video streams downstream the IMAM, but the important point is that the mediator IMAM has avoided redundant video streams upstream the IMAM.

As explained below with more details, the mediator IMAM will use the streams that it receives, for constituting all the streams that have been requested by the terminal for the video call conference:

The web terminal T1 has requested the video data streams respectively generated by the terminals T2, T3, T4, in the so called projecting mode, i. e. without mixing the images respectively captured by the different terminals T2, T3, T4.

The web terminal T2 has requested the video data streams respectively generated by the terminals T1, T2, T3, T4, in the so called tiled display mode, i. e. they are mixed in a single stream such that each received image comprises four quarters respectively showing four images respectively captured by the terminals T1, T2, T3, T4.

The terminal T3 has requested the video data streams respectively generated by the terminals T1, T2, T3 in projecting mode.

The terminal T4 has requested the video data streams respectively generated by the terminals T1, T2, T3, T4, in tiled display mode.

Figure 4:
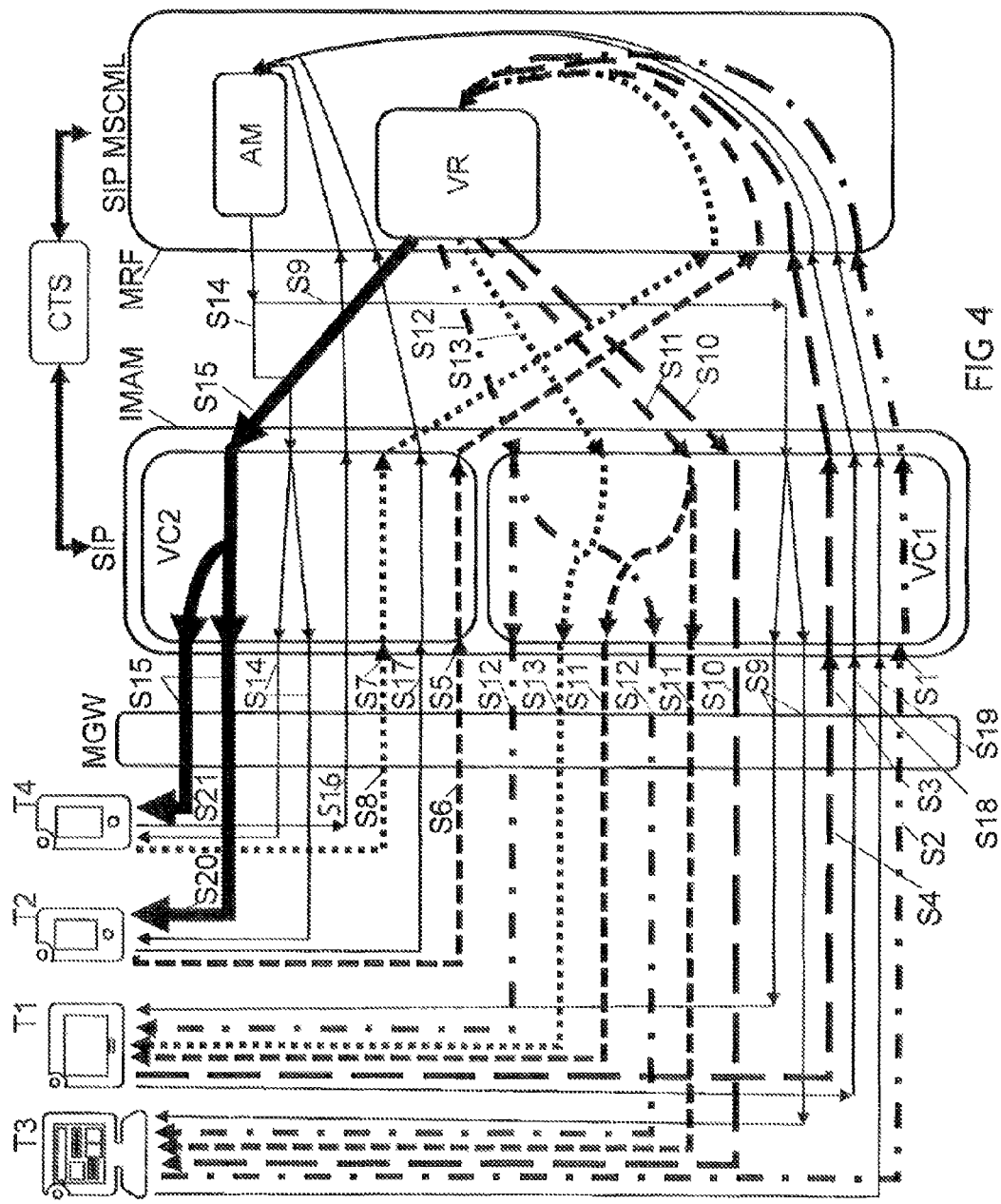
FIG. 4 is a block diagram illustrating the functions of this first embodiment with more details.

FIG. 4 is a block diagram illustrating the functions of this first embodiment IMAM with more details. This embodiment gathers, in a same functional block, referenced IMAM:
software means for receiving video content requests from terminals when they request to take part in a video call conference, and for optimizing these requests, in order to avoid requesting any redundant video stream from the multimedia resource function, before forwarding the optimized requests to the multimedia resource function MRF;
software means for implementing one or several virtual conferees, as a function of the video content requests from said terminals, for receiving the video streams that have been requested by the optimized requests, from the multimedia resource function MRF, and then forwarding the received video streams to the terminals that have requested them, in a broadcast way when a same video stream has been requested by several terminals;
and software means for commanding the convergence telephony server CTS to accept the implemented virtual conferees in the video call conference.

In order to enable a mediator to optimize the requests of all the terminals of a group of users attending a given video conference (e. g. webRTC users within a video call conference), it is necessary to use the same mediator for all these terminals. So a front end mediator according to the invention must be implemented to direct the requests of all the terminals used by this group of users to a same mediator according to the invention.

In the example described here, the mediator IMAM receives:
from the terminal T1, a first request to receive the video streams originating from the terminal T2, T3, T4, in projecting mode;
from the terminal T3, a second request to receive the video streams originating from the terminal T1, T2, T3 in projecting mode;
and, from the terminals T2 and T4, a third and a fourth request to receive a video data stream generated by combining, in tiled display mode, the images captured by the terminals T1, T2, T3, T4.

The media gateway MGW is classical. It converts the video streams S2, S4 originating from the terminals T3, T1 respectively into video streams S1, S3. It transmits the streams S6 and S8 coming from the terminals T2 and T4, as streams S5, S7, without modification because these terminals T2 and T4 belong to the IMS network.

It converts the audio streams originating from the terminals T1, T3 respectively into audio streams S18, S19. It transmits the streams coming from the terminals T2 and T4, as streams S17, S16, without modification because these terminals T2 and T4 belong to the IMS network.

The multimedia resource function MRF is classical, it comprises:
An audio mixer AM that can receive a plurality of audio streams and create a new audio stream that is a mix of all the received audio streams. In this example, it receives four audio streams S16, S17, S18, S19 originating from the terminals T4, T2, T1, T3, respectively, via the media gateway MGW and the mediator IMAM; and creates an audio mix that is then copied into two identical audio streams S9 and S14 supplied to the mediator IMAM.
A video renderer VR that can receive and process a plurality of video streams. In this example, it receives four video streams S3, S5, S1, S7 originating from the terminal T1, T2, T3, T4, respectively, via the media gateway MGW and the mediator IMAM, and it generates:
A new video stream S15 where each image is composed of images from all the received video streams, in tiled mode. It is supplied to the mediator IMAM.
Four video streams S10, S11, S12, S13 that are respectively identical to the received video streams S3, S5, S1, S7. They are supplied to the mediator IMAM.

The mediator IMAM optimizes the requests from the terminals, as described with reference to FIG. 3. It commands the convergence telephony server CTS to accept two virtual conferees VC1 and VC2; and implements them in the mediator IMAM itself:
A first virtual conferee VC1 for dealing with the first and second requests because they pertain to some common video contents (from terminals T2 and T3) implying some potential redundant video stream transmissions from the multimedia resource function MRF to the terminals T1 and T3.
A second virtual conferee VC2 that acts as a mediator for dealing with the third and fourth request because they pertain to some common video contents (from terminals T2 and T4) implying some potential redundant video stream transmissions from the multimedia resource function MRF to the terminals T2 and T4.

The first virtual conferee VC1 forwards the video steams S1 and S3, originating from the terminals T1 and T3 via the media gateway MGW, to the video renderer VR; and forwards the audio streams S18, S19 respectively originating from the terminals T1 and T3, via the media gateway MGW, to the audio mixer AM.

The first virtual conferee VC1 forwards the video steams S10, S11, S12, S13, originating from the video renderer VR:
It sends the video stream S10 to the terminal T3 via the media gateway MGW that converts it.
It broadcasts the video stream S11 by two identical streams respectively sent to the terminals T1 and T3 via the media gateway MGW that converts them.
It sends the video stream S13 to the terminal T1 via the media gateway MGW that converts it.
It broadcasts the video stream S12 by two identical streams respectively sent to the two terminals T1 and T3 via the media gateway MGW that converts them.
It also broadcasts the audio stream S9 (mix of the four original audio streams) in two identical audio streams respectively sent to the terminals T1 and T3 via the media gateway MGW that converts them.

The second virtual conferee VC2 forwards the video steams S5 and S7, originating from the terminals T2 and T4 via the media gateway MGW, to the video renderer VR; and forwards the audio streams S17, S16 originating from the terminals T2 and T4 to the audio mixer AM.

The second virtual conferee VC2 broadcasts the video stream S15 (tiled mode), originating from the video renderer VR, in two identical video streams sent to the terminals T2 and T4 respectively, via the multimedia gateway MGW. This latter forwards them as streams S20, S21 without modifying them. It also broadcasts the audio stream S14 (mix of the four original audio streams) in two identical audio streams respectively sent to the terminals T2 and T4 via the multimedia gateway MGW that converts them.

Other embodiments could consist to implement the mediator according to the invention in two separate parts:

A first part, located in the multimedia resource function MRF, comprises: Software means for receiving video content requests from terminals, and for optimizing these requests; and software means for commanding the convergence telephony server CTS to accept virtual conferees, in the video call conference.

A second part, located in (or near) the multimedia gateway comprises: Software means for implementing one or several virtual conferees, for receiving the video streams requested by the optimized requests and then forwarding the received video streams to the terminals that have requested them, in a broadcast way when a same video stream has been requested by several terminals.

The software means embedded in the multimedia resource function, when receiving several similar video content requests from different terminals, via the multimedia gateway, would take the responsibility to negotiate with the means for implementing virtual conferees, located in (or near) the gateway, and would request them to create appropriate virtual conferees to receive the set of requested video streams only once; and to forward or broadcast the appropriate ones to the terminals.

Figure 5:
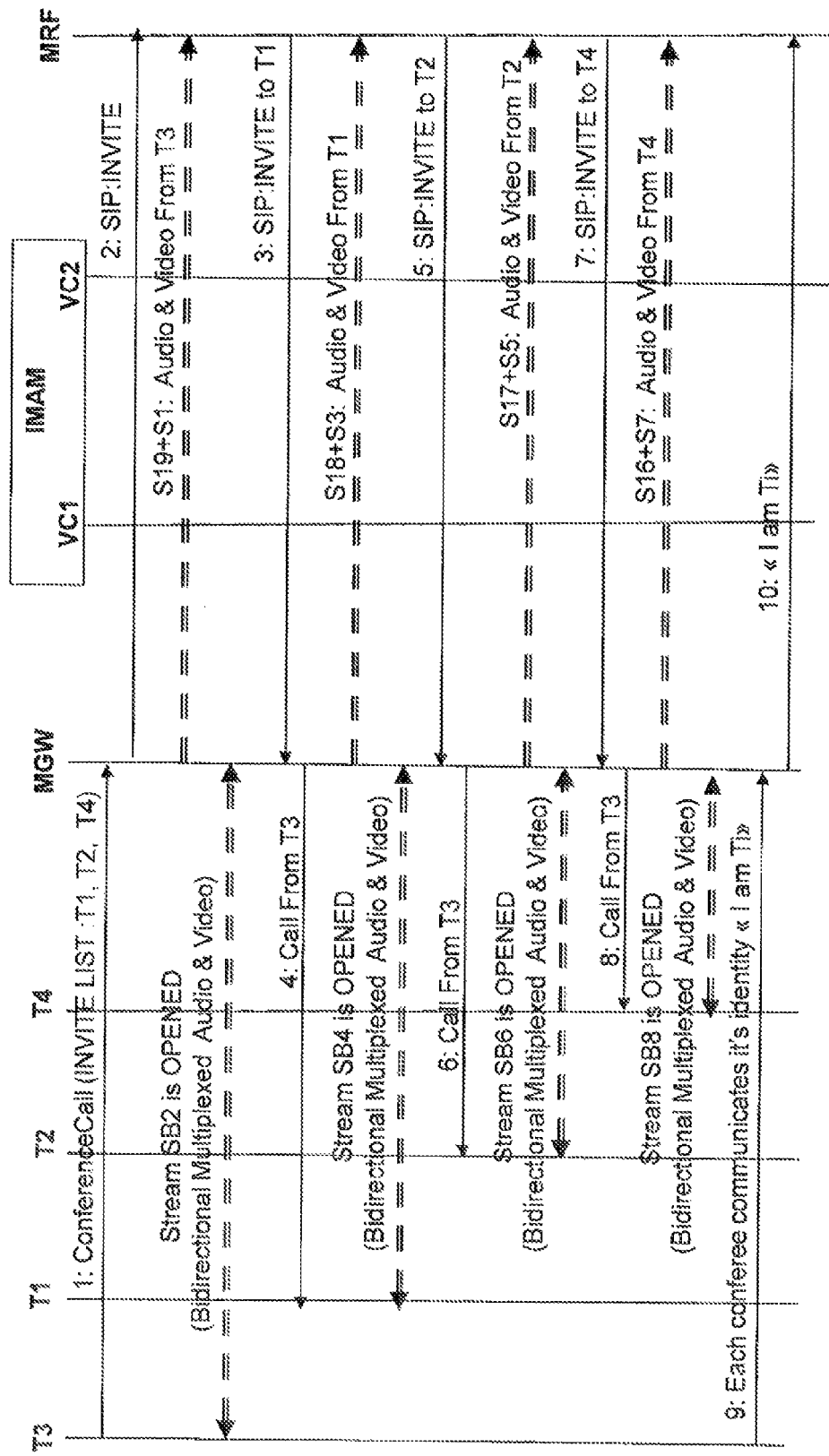
FIGS. 5 to 9 represent the sequence of signaling messages and data streams in the example illustrated by FIGS. 3 and 4.
Figure 6:
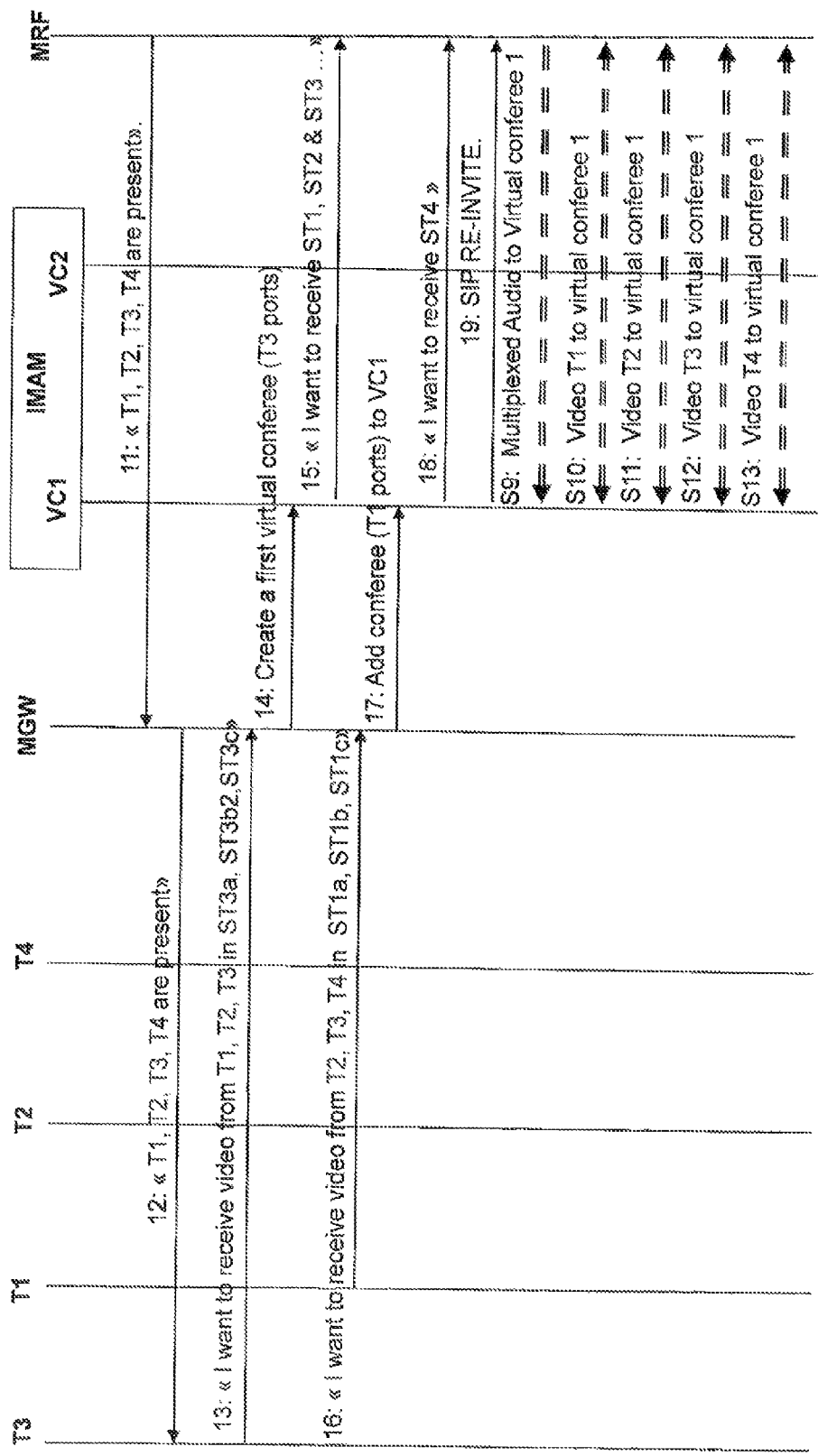
Figure 7:
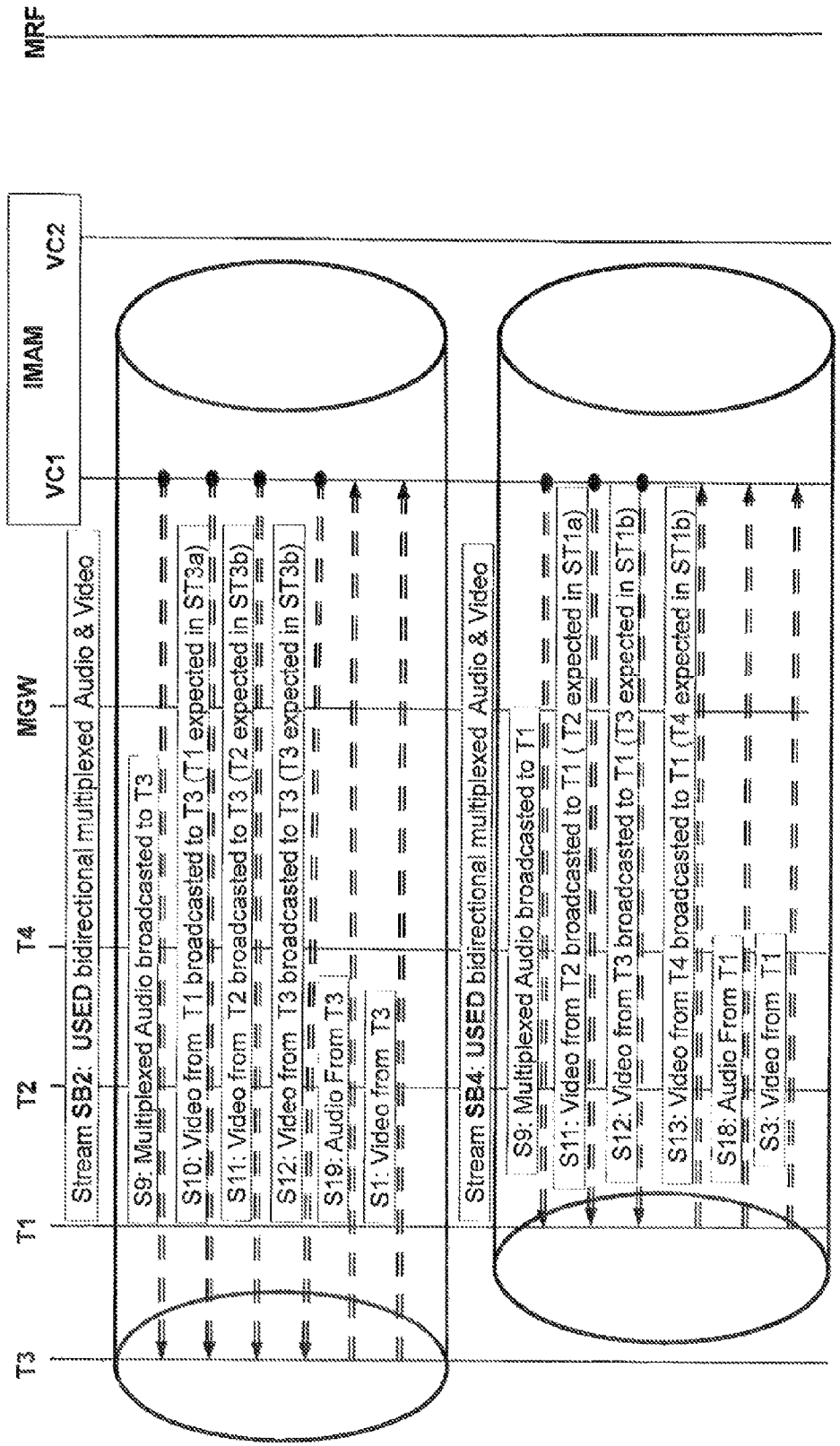
Figure 8:
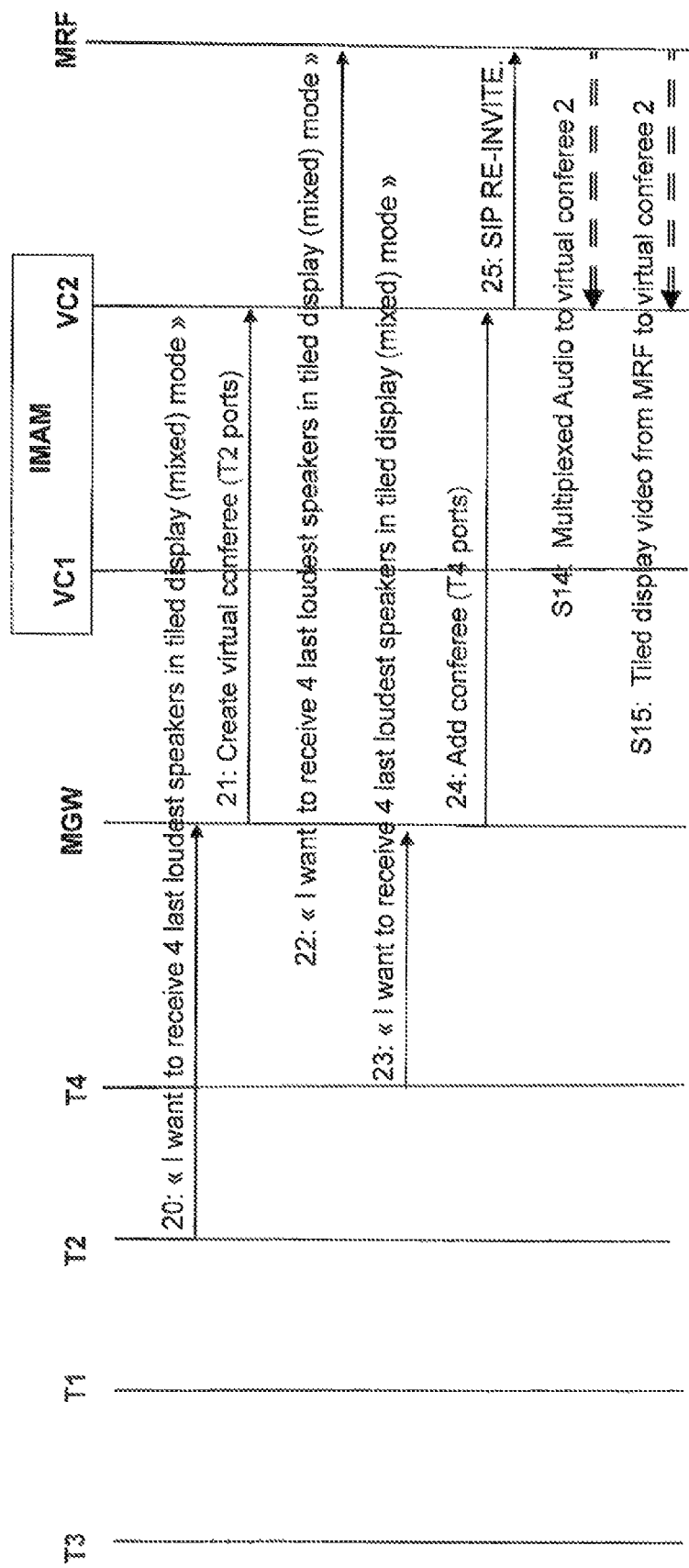
Figure 9:
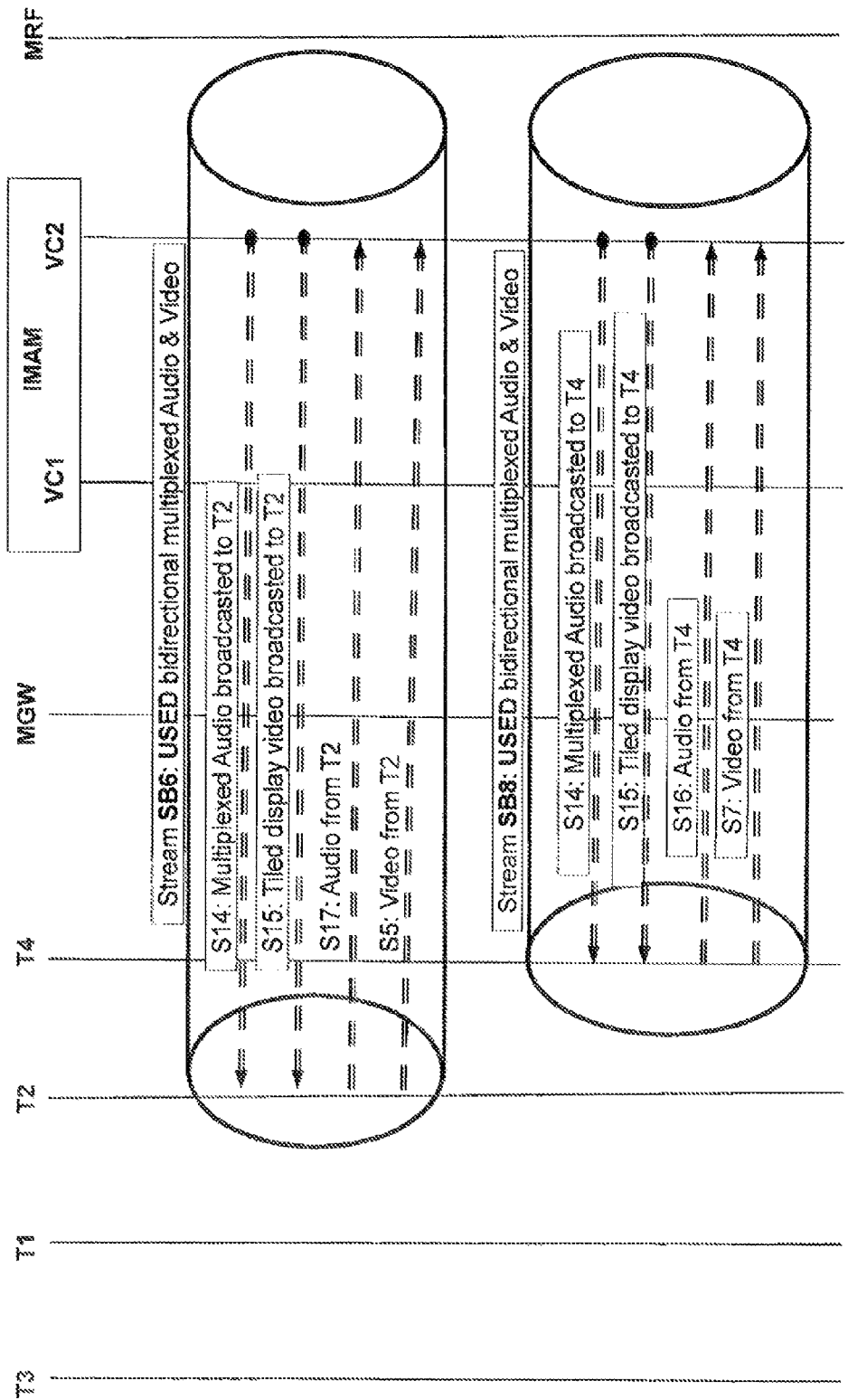

FIG. 5 represents the signaling messages and the video or audio streams exchanged during a video conference call between these four exemplary terminals T1, T2, T3, T4, when the embodiment IMAN of the mediator according to the invention is associated to the classical media gateway MGW, as represented on FIGS. 3 and 4.

Step 1: The terminal T3 initiates a video conference call with the terminals T1, T2, T4, by sending a SIP message INVITE LIST T1, T2, T4, to the media gateway MGW.

Step 2: Then the media gateway MGW, via the convergence telephony server CTS not shown here, sends a SIP message INVITE to the media resource function MRF for setting up a conference including the terminals T1, T2, T3, T4. A multiplexed stream comprising the audio stream S19 and the video stream S1, originating from the terminal T3, is set up between the media gateway MGW and the multimedia resource function MRF. A bidirectional multiplexed audio and video stream SB2 is opened between the media gateway MGW and the terminal T3. It will be used for supplying the media gateway MGW with the data originating from the terminal T3 and that will constitute the video stream S1 and the audio stream S19.

Step 3: The media resource function MRF sends, via the convergence telephony server CTS, a SIP message INVITE to the media gateway MGW for calling the terminal T1, i. e. for inviting the terminal T1 to join the conference.

Step 4: Then the media gateway MGW sends, to the terminal T1, a message indicating a call from the terminal T3. An audio and video stream comprising the audio stream S3 and the video stream S18 is set up from the media gateway MGW to the media resource function MRF. A bidirectional multiplexed audio and video stream SB4 is opened between the terminal T1 and the media gateway MGW. It will be used for supplying the media gateway MGW with the data originating from the terminal T1 and that will constitute the video stream S3 and the audio stream S18.

Step 5: The media resource function MRF sends, via the convergence telephony server CTS, a SIP message INVITE to the media gateway MGW for calling the terminal T2, i. e. for inviting the terminal T2 to join the conference.

Step 6: Then the media gateway MGW sends, to terminal T2, a message indicating a call from the terminal T3. An audio and video stream S5 is set up from the media gateway MGW to the media resource function MRF. An audio and video stream comprising the video stream S5 and the audio stream S17 is set up from the media gateway MGW to the media resource function MRF. A bidirectional multiplexed audio and video stream SB6 is opened between the terminal T1 and the media gateway MGW. It will be used for supplying the media gateway MGW with the data originating from the terminal T2 and that will constitute the video stream S6 and the audio stream S17.

Step 7: The media resource function MRF sends via the convergence telephony server CTS, a SIP message INVITE to the media gateway MGW for calling the terminal T4, i. e. for inviting the terminal T4 to join the conference.

Step 8: Then the media gateway MGW sends, to terminal T4, a message indicating a call from the terminal T3. An audio and video stream comprising the video stream S7 and the audio stream S16 is set up from the media gateway MGW to the media resource function MRF. A bidirectional multiplexed audio and video stream SB8 is set up from the terminal T4 to the media gateway MGW. It will be used for supplying the media gateway MGW with the data originating from the terminal T4 and that will constitute the video stream S8 and the audio stream S16.

Step 9: Each conferee T1, T2, T3, T4 sends a message to the media gateway MGW to communicate its identity "I am Ti" for i=1 to 4.

Step 10: When the media gateway MGW receives a message "I am Ti", it sends a SIP message "I am Ti" to the media resource function MRF.

Step 11: Then the media resource function MRF sends, via the convergence telephony server CTS not shown here, to the media gateway MGW, a SIP message indicating that the terminals T1, T2, T3, T4 are now present in the conference.

Step 12: The media gateway MGW sends, to the terminal T3 (that initiated the call conference), a message indicating that the invited terminals T1, T2, T3, T4 are now present in the conference.

Step 13: Then the user of the terminal T3 indicates what video streams he/she wants to receive during the video call conference. In this example, the terminal T3 sends, to the media gateway MGW, a message requesting to receive the video data streams generated by the terminals T1, T2, T3, in the projecting mode, in video streams that will be called ST3a, ST3b, ST3c.

Step 14: The media gateway MGW sends a message to the mediator IMAM requesting it to create, in the mediator IMAM, a first virtual conferee VC1 and associating the terminal T3 to this first virtual conferee VC1.

Step 15: The first virtual conferee VC1 sends, to the multimedia resource function MRF, a message requesting to receive the audio and video data streams ST1, ST2, ST4 generated by the terminals T1, T2, T4.

Step 16: Then the user of the terminal T1 indicates what video streams he/she wants to receive during the video call conference. In this example, the terminal T1 sends, to the media gateway MGW, a message requesting to receive the data streams generated by the terminals T2, T3, T4, in the projecting mode, in video streams that will be called ST1$a$, ST1$b$, ST1$c$.

Step 17: The media gateway MGW sends a message to the mediator IMAM requesting that it associates the terminal T1 to the first virtual conferee VC1 (along with the already associated terminal T3).

Step 18: The first virtual conferee VC1 sends, to the multimedia resource function MRF, a message requesting to receive the video data stream ST4 generated by the terminals T4.

Step 19: Then the first virtual conferee VC1 sends, to the media gateway MGW, a SIP message RE-INVITE to re-negotiate the previously negotiated steps 2 & 3, and add missing audio and video streams. This RE-INVITE overrides the first negotiation made by the media gateway MGW on behalf of the terminals T3 and T1.

The audio data generated by the terminal T1, T2, T3, T4 are multiplexed by the audio mixer AM of the media resource function MRF. The resulting multiplexed audio is sent from the multimedia resource function MRF to the virtual conferee VC1 in the audio stream S9.

The video stream S10 constituted of the video data generated by the terminal T1 is sent from the multimedia resource function MRF to the virtual conferee VC1.

The video stream S11 constituted of the video data generated by the terminal T2 is sent from the multimedia resource function MRF to the virtual conferee VC1. The video stream S12 constituted of the video data generated by the terminal T3 is sent from the multimedia resource function MRF to the virtual conferee VC1. The video stream S13 constituted of the video data generated by the terminal T4 is sent from the multimedia resource function MRF to the virtual conferee VC1. The bidirectional stream SB2 that has been opened at step 2 is now used for:
for sending to the terminal T3 the following streams:
S9: Multiplexed Audio.
S10: Video from T1 broadcasted to T3 (T1 expected in ST3$a$)
S11: Video from T2 broadcasted to T3 (T2 expected in ST3$b$
S12: Video from T3 broadcasted to T3 (T3 expected in ST3$b$)
for sending from the terminal T3 to the virtual conferee VC1:
S19: Audio from T3
S1: Video from T3
The bidirectional stream SB4 that has been opened at step 2 is now used for:
for sending from the virtual conferee VC1 to the terminal T1 the following streams:
S9: Multiplexed Audio broadcasted to T1.
S11: Video from T2 broadcasted to T1 (T2 expected in ST1$a$)
S12: Video from T3 broadcasted to T1 (T3 expected in ST1$b$)
S13: Video from T4 broadcasted to T1 (T4 expected in ST1$b$)

for sending from the terminal T1 to the virtual conferee VC1 the following streams:
S18: Audio from T1
S3: Video from T1

Step 20: The terminal T2 sends a message to the media gateway MGW to indicate that it wants to receive the video data corresponding to the four loudest speakers, in tiled display mode (In this example, they are the video data from T1, T2, T3, T4).

Step 21: The media gateway MGW creates a second virtual conferee VC2 and associates the terminal T2 to this second virtual conferee VC2.

Step 22: The second virtual conferee VC2 sends, to the media resource function MRF, a message requesting to receive the four loudest speakers in tiled display mode.

Step 23: The terminal T4 sends a message to the media gateway MGW to indicate that it wants to receive the video data corresponding to the four loudest speakers, in tiled display mode.

Step 24: The media gateway MGW associates the terminal T4 to the second virtual conferee VC2 (along with the terminal T2 already associated).

Step 25: Then the second virtual conferee VC2 sends, to the media gateway MGW, a SIP message RE-INVITE to re-negotiate the previously negotiated steps 2 & 3, and add missing audio and video streams. This RE-INVITE overrides the first negotiation made by the media gateway MGW on behalf of the terminals T2 and T4.

The audio data generated by the terminal T1, T2, T3, T4 are multiplexed by the audio mixer AM of the media resource function MRF. A resulting multiplexed audio stream S14 is sent from the multimedia resource function MRF to the second virtual conferee VC2. The video stream S15 constituted of the tiled video data generated by the terminals T1, T2, T3, T4, is sent from the multimedia resource function MRF to the second virtual conferee VC2.

The bidirectional stream SB6 that has been opened at step 8 is now used for:
for sending from the virtual conferee VC2 to the terminal T2 the following streams:
S14: Multiplexed Audio.
S15: Tiled display video.
for sending from the terminal T2 to the virtual conferee VC2 the following streams:
S17: Audio from T2.
S5: Video from T2.
The bidirectional stream SB8 that has been opened at step 2 is now used for:
for sending from the virtual conferee VC2 to the terminal T4 the following streams:
S14: Multiplexed Audio.
S15: Tiled display video.
for sending from the terminal T4 to the virtual conferee VC2 the following streams:
S16: Audio from T4
S7: Video from T4

Figure 10:
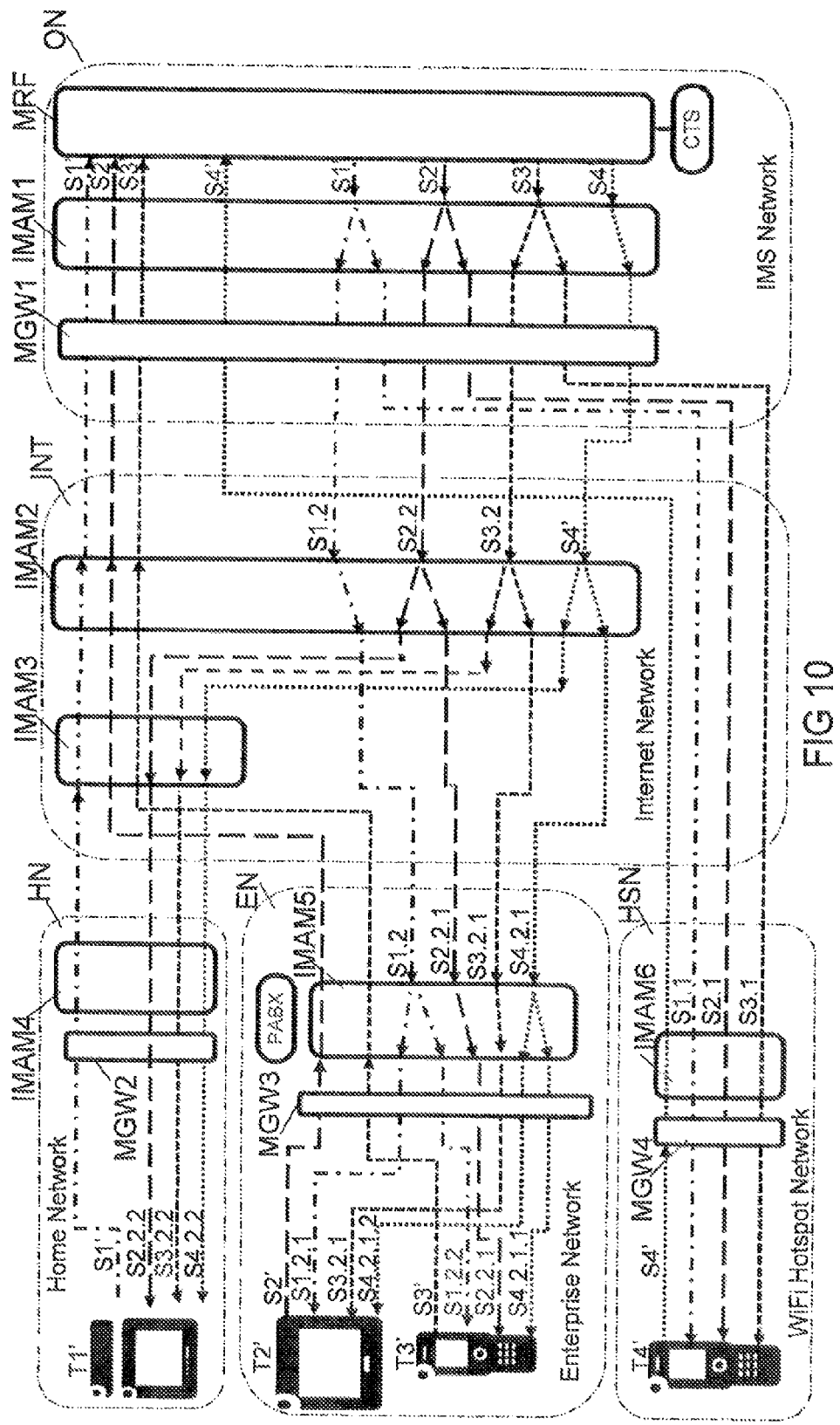
FIG. 10 is a block diagram illustrating the cascading of several mediators according to the invention, during a conference call.

FIG. 10 is a block diagram illustrating the use of several mediators IMAM1, IMAM2, IMAM3, IMAM4, IMAM5 according to the invention, during a conference call for a video call conference attended by four exemplary terminals:
A terminal T1' that is a TV set top box connected to a home network HN comprising a media gateway MGW2 and a mediator IMAM4 connected to the Internet INT.
A terminals T2' that is a PC, and a terminal T3' that is a smartphone. They are connected to an enterprise network EN comprising a switch PABX, a media gateway MGW3, and a mediator IMAM5 connected to the Internet INT.

A terminal T4' that is a smartphone connected to a WiFi hotspot network HSN, for instance in an airport, this network HSN comprising a media gateway MGW4 and a mediator IMAM5 connected to the Internet INT.

Each of these terminals comprises means for taking part to a video conference call. The video conference call is set up by means located in an IMS operator network ON comprising:

A classical convergence telephony server CTS associated to a classical multimedia resource function MRF.

A mediator IMAM1.

A classical media gateway MGW1 at the border between the Internet INT and the operator network ON.

A classical signaling gateway (not represented) at the border between the Internet INT and the operator network ON.

The media gateway MGW1 converts the audio and video data streams from the Web standards (eg. W3C webRTC or IETF rtcWEB) to the legacy telecommunication standards (eg. 3GPP IMS, OMA RCS . . . ), and conversely. The signaling gateway acts similarly for signalization data streams.

In the home ntework HN, the media gateway MGW2 is located between the terminal T1' and the mediator IMAM4, in order to convert audio and video streams if a terminal, such as T1', cannot support the protocols used on the Internet INT. In the enterprize network EN, the media gateway MGW3 is located between the terminals T2', T3' and the mediator IMAM5 in order to convert audio and video streams if a terminal, such as T2' or T3', cannot support the protocols used on the Internet INT.

In the hot spot network, the media gateway MGW4 is located between the terminal T4' and the mediator IMAM6 in order to convert audio and video streams if a terminal, such as T4', cannot support the protocols used on the Internet INT. Similarly, signaling gateways (not represented) are associated to these media gateways for converting the signaling messages. The functions of these signaling gateways are classical.

The mediator IMAM1 is used for optimizing the transmission of video streams between the multimedia resource function MRF and the gateway MGW1 enabling the access to the Internet INT.

A carrier provides mediators IMAM2 and IMAM3 in the Internet INT. They are cascaded so that they enable to optimize the transmission of data streams between two distant nodes of the Internet. In the example illustrated by FIG. 10, these mediators IMAM2 and IMAM3 are used for optimizing the transmission of video streams between the gateway MGW1 and a plurality of various networks: HN, EN, HSN.

The mediator IMAM4 is used for optimizing the transmission of video streams between the Internet INT and the home network HN.

The mediator IMAM5 is used for optimizing the transmission of video streams between the Internet INT and the enterprize network EN.

The mediator IMAM6 is used for optimizing the transmission of video streams between the Internet INT and the WiFi hotspot network HSN.

The terminals T1', T2', T3', T4' can be put into a video call conference altogether thanks to the multimedia resource function MRF. This latter operates under the command of the convergence telephony server CTS. The multimedia resource function MRF manages and allocates audio and video processing resources to match the requirements of each application. In this example, its role is to handle requests from the convergence telephony server CTS for performing media processing on packetized media streams for a video call conference.

In this example all the terminals T1', T2', T3', T4' use a same codec and a same format for generating and receiving a video stream: For instance, the classical codec VP8 and the classical format VGA. The terminals T1', T2', T3', T4' respectively generate video data stream S1', S2', S3', S4'.

The terminal T1' requests the convergence telephony server CTS to send it the video data streams respectively generated by the terminals T2', T3', T4', in projecting mode, i. e. without mixing the images respectively captured by the different terminals T2', T3', T4'.

The terminal T2' requests the convergence telephony server to send it the video data streams respectively generated by the terminals T1', T3', T4', in projecting mode.

The terminal T3' requests the convergence telephony server to send it the video data streams respectively generated by the terminals T1', T2', T4' in projecting mode.

The terminal T4' requests the convergence telephony server CTS to send it the video data streams respectively generated by the terminals T1', T2', T3' in projecting mode.

An audio stream that is a mix of the four audio streams generated by the terminals T1', T2', T3', T4' will be broadcast to the four terminals T1', T2', T3', T4'. These audio streams are not represented on the figure.

Under the command of the convergence telephony server CTS, the media resource function MRF generates four video data streams that are referenced S1', S2', S3', S4' because they are identical to the received video streams S1', S2', S3', S4'. The media resource function MRF sends them to the mediator IMAM1. The transmission of these video streams up to the gateway MGW1, through the operator network ON, implies some potential redundancy. The mediator IMAM1 is used for avoiding any redundant transmission.

The video stream S1' is needed by the enterprise network EN for two terminals T2' and T3', and is needed by the network HSN for one terminal T4'. The media stream S1' is transmitted once only from the media resource function MRF to the mediator IMAM1. This latter copies it into two streams S1.1 and S1.2.

The stream S1.1 is sent to the mediator IMAM6 for use by terminals of the WiFi hot spot network HSN. As the stream S1' has been requested by the terminal T4' only, in the WiFi hotspot network HSN, the mediator IMAM6 directly forwards the stream S1.1 to the terminal T4'.

The stream S1.2 is sent to the mediator IMAM5, via the mediator IMAM2, for use by terminals of the enterprise network EN. As the stream S1' has been requested by the terminals T2' and T3', the mediator IMAM5 copies the stream S1.2 into two streams S1.2.1 and S1.2.2 and sends them to the terminal T2' and T3' respectively.

The video stream S2' is needed by the home network HN for the terminal T1', by the enterprise network EN for the terminal T3', and by the WiFi hotspot network HSN for the terminal T4'. The media stream S2' is transmitted once only from the media resource function MRF to the mediator IMAM1. This latter copies it into two streams S2.1 and S2.2.

The stream S2.1 is sent to the mediator IMAM6 for use by terminals of the WiFi hot spot network HSN. As the stream S2' has been requested by the terminal T4' only, in the WiFi hotspot network HSN, the mediator IMAM6 directly forwards the stream S2.1 to the terminal T4'.

The stream S2.2 is sent to the mediator IMAM2 for use by terminals of the home network HN and of the enterprise network EN. The media stream S2.2 is transmitted once only from the mediator IMAM1 to the mediator IMAM2. This latter copies it into two streams S2.2.1 and S2.2.2. The stream S2.2.1 is sent to the mediator IMAM5 for use by terminals of the enterprise network EN. As the stream S2' has been requested by the terminal T3' only, in the enterprise network EN, the mediator IMAM5 directly forwards the stream S2.2.1 to the terminal T3'.

The stream S2.2.2 is sent to the mediator IMAM4, via the mediator IMAM3, for use by terminals of the home network HN. As the stream S2' has been requested by the terminal T1' only, in the home network HN, the mediator IMAM4 directly forwards the stream S2.2.2 to the terminal T1'.

The video stream S3' is needed by the home network HN for the terminal T1', by the enterprise network EN for the terminal T2', and by the WiFi hotspot network HSN for the terminal T4'. The media stream S3' is transmitted once only from the media resource function MRF to the mediator IMAM1. This latter copies it into two streams S3.1 and S3.2.

The stream S3.1 is sent to the mediator IMAM6 for use by terminals of the WiFi hot spot network HSN. As the stream S3' has been requested by the terminal T4' only, in the WiFi hotspot network HSN, the mediator IMAM6 directly forwards the stream S3.1 to the terminal T4'.

The stream S3.2 is sent to the mediator IMAM2 for use by terminals of the home network HN and of the enterprise network EN. The media stream S3.2 is transmitted once only from the mediator IMAM1 to the mediator IMAM2. This latter copies it into two streams S3.2.1 and S3.2.2.

The stream S3.2.1 is sent to the mediator IMAM5 for use by terminals of the enterprise network EN. As the stream S3' has been requested by the terminal T2' only, in the enterprise network EN, the mediator IMAM5 directly forwards the stream S3.2.1 to the terminal T2'.

The stream S3.2.2 is sent to the mediator IMAM4, via the mediator IMAM3, for use by terminals of the home network HN. As the stream S3' has been requested by the terminal T1' only, in the home network HN, the mediator IMAM4 directly forwards the stream S3.2.2 to the terminal T1'.

The video stream S4' is needed by the home network HN for the terminal T1', and by the enterprise network EN for the terminals T2' and T3'. The media stream S4' is transmitted from the media resource function MRF to the mediator IMAM1. This latter transmits it to the mediator IMAM2. The mediator IMAM2 copies it into two streams S4.2.1 and S4.2.2. The stream S4.2.1 is sent to the mediator IMAM5 for use by terminals of the enterprise network EN. As the stream S4' has been requested by the terminals T2' and T3', in the enterprise network EN, the mediator IMAM5 copies the stream S4.2.1 into two streams S4.2.1.1 and S4.2.1.2. The media stream S4.2.1 is transmitted once only from the mediator IMAM2 to the mediator IMAM5.

The stream S4.2.1.2 is sent to the terminal T2'. The stream S4.2.1.1 is sent to the terminal T3'.

The stream S4.2.2 is sent to the mediator IMAM4, via the mediator IMAM3, for use by terminals of the home network HN. The mediator IMAM4 transmits it to the terminal T1'.

There is claimed:

1. A system configured to transmit media contents between a mediator, a multimedia resource, and a plurality of terminals, when these terminals are conferees in a same video call conference created by a telephony server, the system comprising:
the mediator configured to,
transmit media contents between a multimedia resource and a plurality of terminals when the terminals are conferees in a same video call conference created by a telephony server, the mediator configured to:
receive video content requests from the terminals when the terminals request to take part in the same video call conference,
determine non-redundant ones of the received video content requests, the non-redundant video content requests being requests for video streams that have not been previously requested by one of the plurality of terminals,
forward the determined non-redundant video content requests to the multimedia resource,
implement virtual conferees as a function of the video content requests from the terminals, the virtual conferees configured to
receive video streams that have been requested from the multimedia resource, and
forward, in a broadcast way, the requested video streams to the terminals, and
command the telephony server to accept the implemented virtual conferees in the video call conference.

2. A system configured to transmit media contents between a multimedia resource and a plurality of terminals via a gateway, when these terminals are conferees in a same video call conference created by a telephony server, the system comprising:
the gateway configured to
receive non-redundant video content requests from a multimedia resource based on video content requests from the terminals, the non-redundant video content requests being requests for video streams that have not been previously requested by one of the plurality of terminals,
implement virtual conferees in the video call conference when the non-redundant video content requests include requests for a same video stream by several of the plurality of terminals, the virtual conferees being configured to
receive the same video stream and
forward the received same video stream to the terminals that have requested the same video stream, in a broadcast way, when the same video stream has been requested by several terminals.

3. The system of claim 2, the system further comprising:
the multimedia resource configured to
receive the video content requests from the plurality of terminals,
determine non-redundant video content requests among the received video content requests, the non-redundant video content requests being requests for video streams that have not been previously requested by one of the plurality of terminals,
command the telephony server to accept the virtual conferees in the video call conference, based on the determined non-redundant video content requests.

4. A system configured to transmit media contents between a multimedia resource and a plurality of terminals via a gateway, when these terminals are conferees in a same video call conference created by a telephony server, the system comprising: the multimedia resource configured to, receive video content requests from terminals when the terminals request to take part in the video call conference, determine non-redundant ones of the received video content requests, the non-redundant video content requests being requests for video streams that have not been previously requested by one of the plurality of terminals, command the telephony server to accept conferees in the video call conference, based on the determined non-redundant video content requests, the commanding the telephony server to accept conferees includes commanding the telephony server to accept virtual conferees in the video call conference, the virtual conferees being configured to receive a video stream, and forward received video stream to the terminals that have requested the video stream in a broadcast way.

5. A method for transmitting media contents between a multimedia resource and a plurality of terminals when the terminals are conferees in a same video call conference created by a telephony server, the method comprising:
   receiving the video content requests from the terminals when the terminals request to take part in the video call conference,
   determining non-redundant ones of the received video content requests, the non-redundant video content requests being requests for video streams that have not been previously requested by one of the plurality of terminals;
   forwarding the determined non-redundant video content requests to the multimedia resource;
   implementing virtual conferees as a function of the video content requests from the terminals, the virtual conferees
     receiving the video streams that have been requested from the multimedia resource, and
     forwarding, in a broadcast way, the requested video streams to the terminals; and
   commanding the telephony server to accept the implemented virtual conferees in the video call conference.

* * * * *